United States Patent [19]

Kuno et al.

[11] Patent Number: 4,513,231
[45] Date of Patent: Apr. 23, 1985

[54] CONTROL CIRCUIT OF PULSE WIDTH MODULATION INVERTER

[75] Inventors: Toshitaka Kuno; Hiroshi Moribe, both of Nagoya; Shojirou Miyamoto, Ama, all of Japan

[73] Assignee: Kabushiki Kaisha Toyota Chuo Kenkyusho, Japan

[21] Appl. No.: 464,396

[22] Filed: Feb. 7, 1983

[30] Foreign Application Priority Data

Feb. 12, 1982 [JP] Japan .................................. 57-21805

[51] Int. Cl.³ ............................................ H02P 5/06
[52] U.S. Cl. ................................. 318/341; 318/345 B; 318/345 F
[58] Field of Search ................ 318/341, 345 B, 345 F, 318/617, 618, 326, 398, 463

[56] References Cited

U.S. PATENT DOCUMENTS

| | | | |
|---|---|---|---|
| 4,151,450 | 4/1979 | Fukuma et al. | 318/341 X |
| 4,233,549 | 11/1980 | Dighe | 318/345 F X |
| 4,378,517 | 3/1983 | Morton et al. | 318/341 X |
| 4,413,212 | 11/1983 | Okamoto et al. | 318/341 X |

Primary Examiner—Ulysses Weldon
Attorney, Agent, or Firm—Parkhurst & Oliff

[57] ABSTRACT

The invention relates to a control circuit of a pulse width modulation inverter, wherein a current control circuit to output a current control signal corresponding to a current command signal is provided, main transistors of a main circuit of the pulse width modulation inverter are switchingly controlled in response to a current control signal, whereby a driving current supplied to a motor from the pulse width modulation inverter is controlled to a value corresponding to the current command signal.

The current control circuit is of such an arrangement that the current control circuit corrects the current command signal in response to the speed detection signal to compensate an error in current control due to a counter electromotive force of a DC motor, while exercising a proportional control over the driving current in accordance with a current command deviation value of a driving current detection signal from the current command signal, so that the motor can be controlled at high speed and with high accuracy.

7 Claims, 5 Drawing Figures

CONTROL CIRCUIT OF PULSE WIDTH MODULATION INVERTER

BACKGROUND OF THE INVENTION

1. Field of the Invention

This invention relates to a control circuit of a pulse width modulation (hereinafter referred to as "PWM") inverter for driving a DC motor.

2. Description of the Prior Art

As well known, PWM inverters have been widely used for servo control of DC motors, and are suitable for speed control and torque control for DC motors. In particular, PWM inverters with wherein transistors that are used as the main switching elements of a main circuit can exercise servo control over the DC motor at a higher speed and with higher accuracy.

FIG. 1 shows the conventional PWM inverter with transistors being used as the main switching elements.

Referring to FIG. 1, an AC output from an AC power source 10 is converted into a direct current by a converter 12 and supplied to a main circuit 14 of a PWM inverter. This main circuit 14 has four large power transistors (hereinafter referred to as "PTR") 16 arranged in bridge connection. When PTR's 16, which are disposed at opposite sides, are simultaneously "ON" operated, a positive or negative driving current 100 is supplied to DC motor 18. During this "ON" condition, PTR's 16 are PWM switchingly-driven and consequently, driving current 100 is converted into a PWM current.

The speed of the DC motor 18 is detected by a speed detector 22 and driving current 100 is detected by a current detector 24. The speed detection signal 102 and the current detection signal 104 are supplied to a control circuit 20 where the PWM switchingly-driving of the PTR's 16 are effected.

This control circuit 20 is provided with a speed commanding circuit 26, a speed command signal 106 outputted from speed commanding circuit 26 which is compared with the speed detection signal 102 in a comparator 28. The deviation value from comparator 28 of the speed detection signal 102 from the speed command signal 106 is supplied to a current command restricting circuit 30 as a current command signal 108.

In order to prevent an unduly high current from being supplied to the PTR's 16, which could possibly damage the PTR's or to prevent an unduly high current from being supplied to DC motor 18 which could demagnetize the motor if DC motor 18 is of a magnetic type, a command restricting circuit 30 is utilized to restrict current command signal 108 to a preset current tolerance value.

A restricted current command signal 110 which is restricted to less than the current tolerance value by the current command restricting circuit 30 is supplied to a current control circuit 32 to which the current detection signal 104 is supplied from current detector 24. This current control circuit 32 extracts a current command deviation value of current detection signal 104 from restricted current command signal 110, and outputs a current control signal 112 which corresponds to the current command deviation value. This deviation value is supplied to a driver 34 so that the driving current 100 can be subjected to an integral control.

The driver 34 can PWM switchingly-drive the PTR's 16 simultaneously in response to the current control signal 112 to cause the main circuit 14 to output the positive or negative driving current 100 to DC motor 18.

As described above, in the inverter shown in FIG. 1, there is provided a speed control loop 114 which is a large loop and a current control loop 116 which is a small loop. Description will now be given of the operation of the above-described conventional inverter.

The speed detection signal 102 from speed detector 22 and speed command signal 106 from speed commanding circuit 26 are compared with each other in comparator 28, and, in accordance with a speed command deviation value obtained by the comparison, the speed control loop 114 (the large loop) of control circuit 20 exercises a servo control so that the speed of the DC motor 18 can coincide with speed command signal 106 from speed commanding circuit 26.

Furthermore, the current command signal (the speed deviation value) 108 obtained from comparator 28 is restricted to the current tolerance value by current command restricting circuit 30. The output of circuit 30 is restricted current command signal 110 which is supplied to the current control circuit 32. The current control circuit 32 is included in the current control loop (the small loop) 116, with the current detection signal 104 from the current detector 24 being inputted along with the output from command restricting circuit 30 to the current control circuit 32 to form a comparison. In accordance with the current command deviation value obtained by this comparison, the current control circuit 32 outputs the current control signal 112 to the driver 34. The current control signal 112 PWM switchingly-drives the PTR's 16 of the main circuit 14 to exercise an integral control over the driving current 100, whereby the driving current 100 is controlled to coincide with the restricted current command signal 110.

As described above, in the conventional control circuit 20, the DC motor 18 can be driven by the main circuit 14, and, at this time the switching frequencies of the PTR's 16 can be set at a value higher than that of a thyristor or the like, so that the servo control of the DC motor 18 can be more accurately and in higher responsiveness than in the case of using a thyristor as the main switching element.

However, in the conventional control circuit 20 as described above, an integral control is exercised over the driving current 100 in the current control circuit 32, whereby the responsiveness thereof is low. In consequence, there has been the problem that, even with the recent high improvements in the switching characteristics of the PTR's 16, hitherto there has not been effective utilization of the improved switching characteristics in servo-controlling DC motors at higher speed and with more accuracy.

SUMMARY OF THE INVENTION

The present invention has been developed to obviate the above-described disadvantages of the prior art and has as its object the provision of a control circuit of a PWM inverter, capable of causing main transistors of a main circuit to satisfactorily display high-speed switching characteristics thereof, so that a DC motor driven by the main circuit can be servo-controlled at high speeds and with high accuracy.

To achieve the above-described object, the present invention features control circuits of a PWM inverter more particularly, a current control circuit and a counter electromotive force compensating circuit to output a control signal corresponding to a current command signal. The present invention includes main transistors of a main circuit which are PWM switchingly-driven in response to the control signal so that the main circuit can drive the DC motor by a driving current corresponding to a current command signal. The counter electromotive force compensating circuit corrects the current command signal in response to the speed detection signal of the DC motor to compensate for an unavoidable error in the current control due to a counter electromotive force of the DC motor in a proportional control system. The present invention is able to exercise a proportional control over the aforesaid driving current in accordance with the current command deviation value of the driving current detection signal from the aforesaid current command signal. Furthermore, the present invention features that, in the above-described control circuits, there is provided a current command control circuit for restricting the current command signal in such a manner that the speed detection signal of the DC motor is monitored, and, until the speed of the DC motor reaches a predetermined speed, the driving current is restricted to or less than a preset current tolerance value. When the speed of the DC motor exceeds the predetermined speed, the aforesaid current tolerance value is rectilinearly decreased with the increase of the speed of the DC motor being within a region where the DC motor is not brought to a flashover.

Description will hereunder be given of the preferred embodiment of the control circuit according to the present invention with reference to the drawings.

DESCRIPTION OF THE PREFERRED EMBODIMENT

Figure 1:
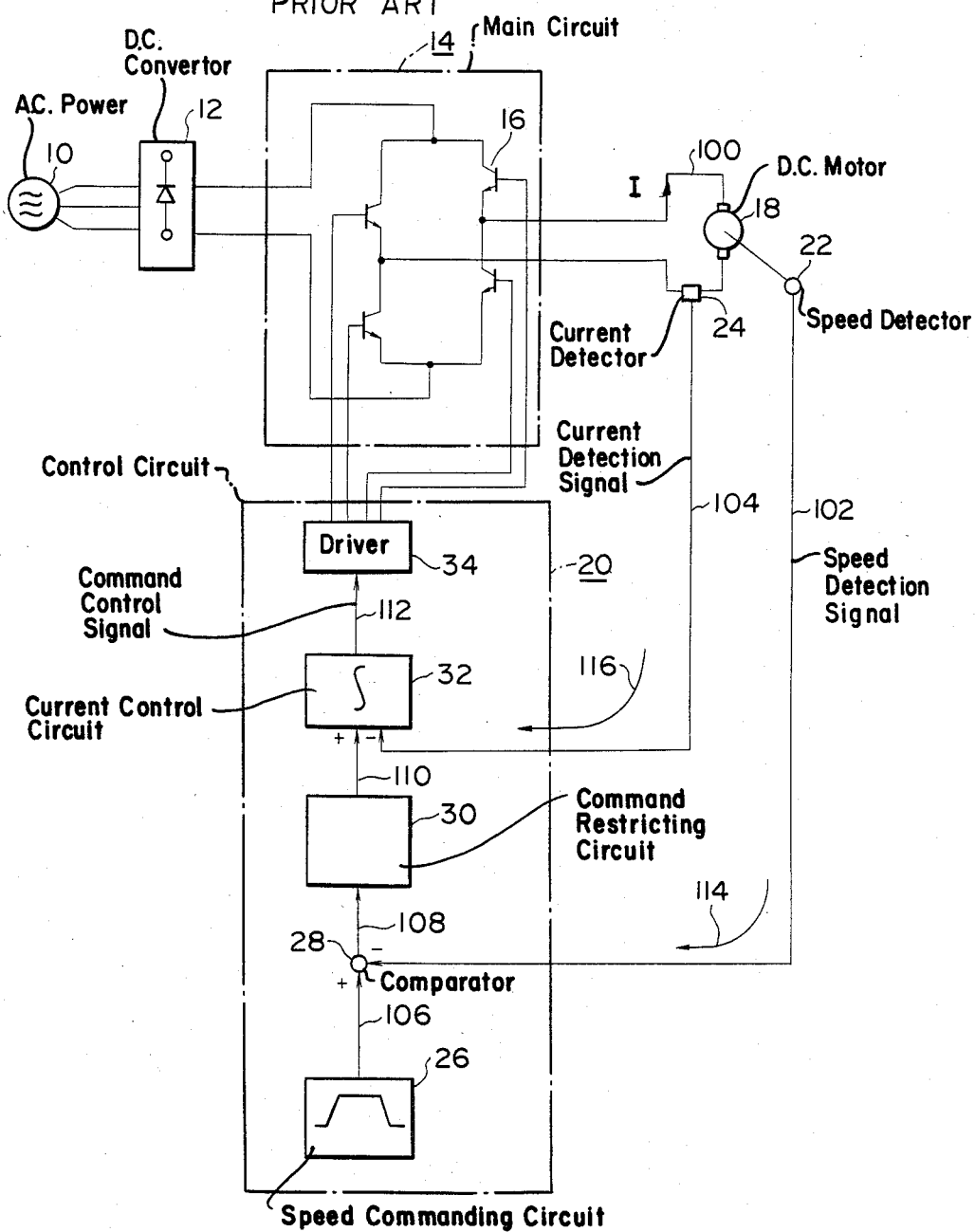
FIG. 1 is a block diagram showing the PWM inverter of the prior art.
Figure 2:
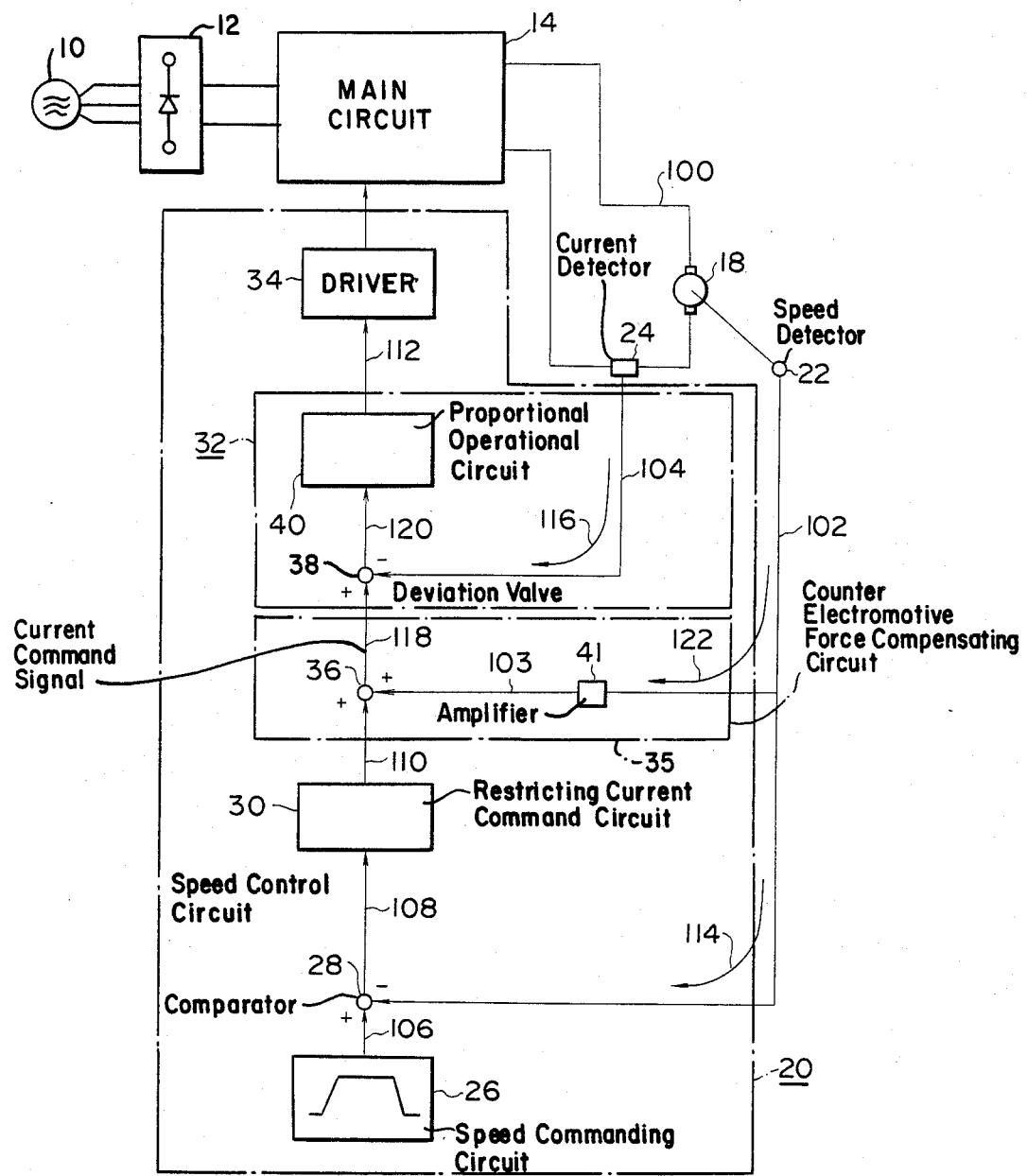
FIG. 2 is a block diagram showing a preferred embodiment of the present invention.

FIG. 2 shows a preferred embodiment of the present invention. Same reference numerals as shown in FIG. 1 are used in FIG. 2 to designate same or similar parts, so that detailed description thereof will be omitted.

The present invention provides a current control circuit and a counter electromotive force compensating circuit for correcting a current command deviation value in response to a speed detection signal to compensate for an unavoidable error in current control due to a counter electromotive force of a DC motor. The present invention also provides for a command control over a driving current in accordance with a current command deviation value of a driving current detection signal from a current command signal.

The present embodiment includes a current control circuit 32 and a counter electromotive force compensating circuit 35. The current control circuit 32 includes a comparator 38 and a proportional operational circuit 40. The counter electromotive force compensating circuit 35 includes an adder 36 and an amplifier 41. The adder 36 is supplied with a restricted current command signal 110 and a speed detection signal 102 and can output a current command signal 118 which represents speed detection signal 102 added to restricted current command signal 110. This current command signal 118 is supplied to comparator 38 of current control circuit 32. Current detection signal 104 is also inputted to comparator 38 which outputs a current command deviation value 120 of a current detection signal 104 from the current command signal 118. Then, the current command deviation value 120 is supplied to the proportional operational circuit 40, which outputs a current control signal 112 corresponding to current signal deviation value 120 to a driver 34, whereby the proportional operational circuit 40 can exercise a proportional control over driving current 100.

As described above, according to the present invention, the current control circuit 32 and counter electromotive force compensating circuit 35 exercise the proportional control over the driving current 100. An error occurs in the current control due to a counter electromotive force of the DC motor 18. Consequently, in the present embodiment, adder 36 and amplifier 41 are provided in the counter electromotive force compensating circuit 35. Here, the counter electromotive force compensating circuit 35 is of such an arrangement that a counter electromotive force compensating loop 122 is formed such that current command signal 110 is corrected by a value 103 obtained through the multiplication of the speed detection signal 102 by a predetermined gain of an amplifier 41. The proportional operational circuit 40 of current control circuit 32 exercises the operational control over the driving current 100 in accordance with the thus corrected current command signal 118.

A preferred embodiment of the present invention is of the above-described arrangement. Description will now be given of operation thereof.

A current command signal 108 obtained through a comparison of a speed command signal 106 with a speed detection signal 102 in comparator 28 is supplied to a current command restricting circuit 30. The output of the command restricting circuit 30 is supplied to the counter electromotive force compensating circuit 35. The output of the compensating circuit 35 is supplied to the current control circuit 32. The current control circuit 32 obtains the current command deviation value 120 in accordance with the restricted current command signal 110, and exercises the proportional control over the driving current 100 in the proportional operational circuit 40 in accordance with the current command deviation value 120.

When the current control circuit 32 is formed as the proportional control system as described above, and, if no counter electromotive force compensating loop 122 to the compensating circuit 35 is formed as in the present embodiment, a value i of the driving current 100 against a voltage $e_1$ of the current command signal 110 is represented by:

$$i = \frac{K_A}{R + K_A K_1} \cdot e_1 - \frac{K_E}{R + K_A K_1} \cdot n \quad (1)$$

where $K_A$ is a voltage gain in a current control system, $K_1$ a current feedback gain of a current control loop 116, R an armature resistance of the DC motor 18, $K_E$ a constant of counter electromotive force of the DC motor 18, and n a rotational speed of the motor 18.

As understood from Equation No. 1 as described above, when current control circuit 32 merely exercises the proportional control over the driving current 100, an error in the current control in proportion to the DC motor 18 occurs due to a counter electromotive force of the DC motor 18.

Consequently, in the present embodiment, a counter electromotive force compensation circuit 35 is formed to compensate for the current command signal 110. The proportional operational circuit 40 of circuit 32 exercises the proportional control over driving current 100 in accordance with the current command signal 118 obtained through a correction made in adder 36. More specifically, if a value $K_3$ of the correction gain of the amplifier 41 is provided in the counter electromotive force compensating circuit 35, $K_3$ is indicated by:

$$K_3 = K_E/K_A \qquad (2)$$

Then, the aforesaid Equation No. 1 may be represented by:

$$i = \frac{K_A}{R + K_A K_1}\left(e + \frac{K_E}{K_A} n\right) - \frac{K_E}{R + K_A K_1} n = \frac{K_A}{R + K_A K_1} e_1 \qquad (3)$$

so that the error can be corrected.

As described above, the counter electromotive force compensating circuit 35 can correct the current command signal 110 in accordance with the speed detection signal 102 to compensate for an error in the current control due to the counter electromotive force of the DC motor 18. The current control circuit 32 and compensating circuit 35 exercise a command control over the driving current 100 in accordance with the current command deviation value 120 of the current detection signal 104 from the current command signal 118.

As described above, according to the present invention, the current control circuit and compensating circuit exercise the proportional control over the driving current of the main circuit, so that the main transistors of the main circuit can be PWM switchingly-driven at high speed, thus enabling servo control over the DC motor driven by the main circuit at higher speeds and with higher accuracy.

Although an error in the current control occurs due to the counter electromotive force of the DC motor while the aforesaid proportional control is exercised, the compensating circuit makes a correction through the processing of the speed detection signal to thereby compensate for the error in the current control, so that an accurate servo control of the DC motor can be maintained.

However, in the above-described embodiment, the current command restricting circuit 30 restricts the current command signal 108 merely by restricting the value of the driving current 100 to or less than the present current tolerance value. Consequently, if the DC motor 18 is driven at a high speed, then an overload is resulted, and there occurs a possibility of damaging the DC motor due to a flashover.

Therefore, as described above, according to the present invention, there is provided the current command restricting circuit for restricting the current command signal in such a manner that the speed detection signal of the DC motor is monitored, and, until the speed of the DC motor reaches the predetermined speed, the driving current is restricted to or less than the preset current tolerance value, and, when the speed of the DC motor exceeds the predetermined speed, the aforesaid current tolerance value is rectilinearly decreased with the increase in the speed of the DC motor within the region where the DC motor is not brought to a flashover.

Description will hereunder be given of a further embodiment of the present invention, in which flashover does not occur even when the DC motor is driven at a high speed.

Figure 3:
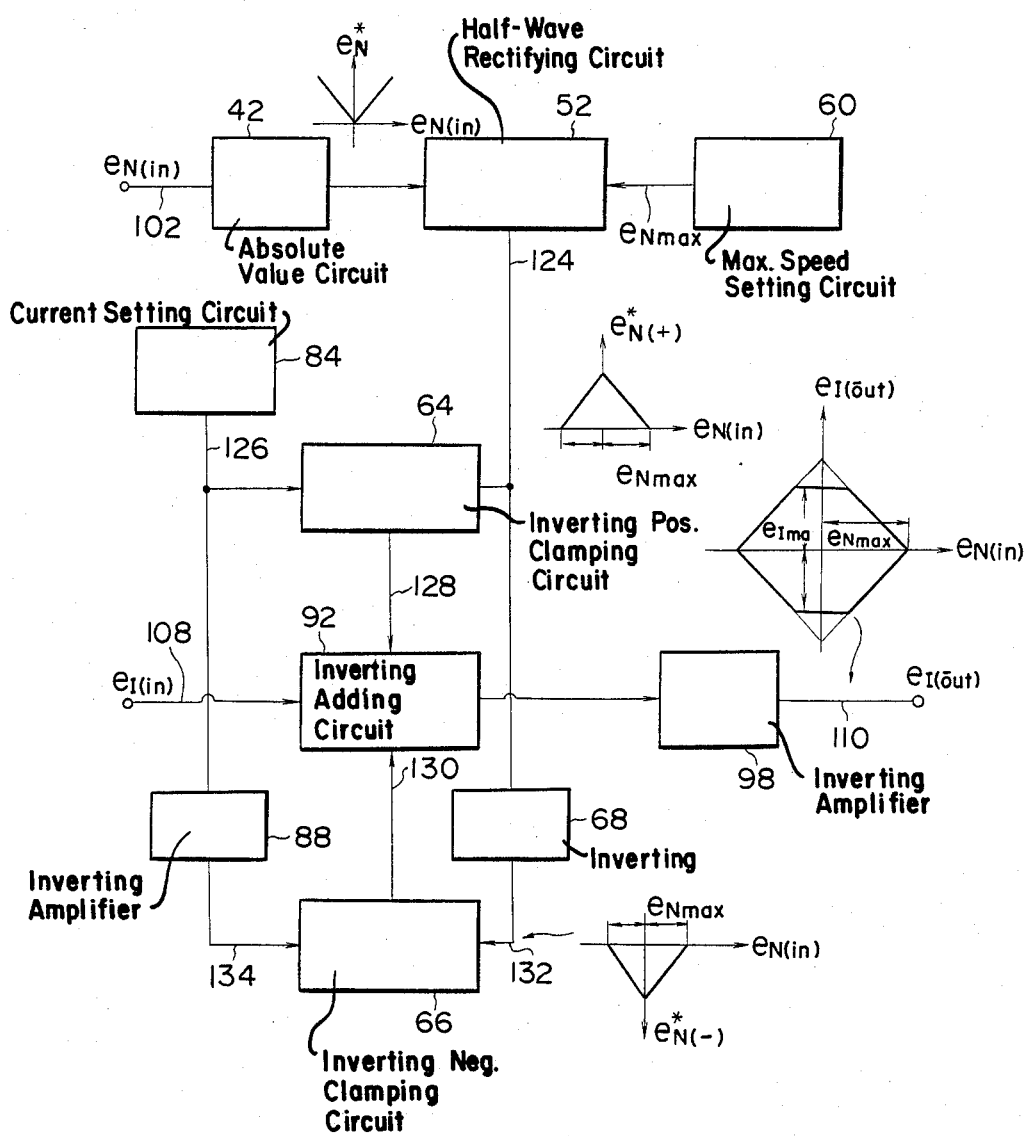
FIG. 3 is a block diagram showing a further embodiment of the present invention.
Figure 4:
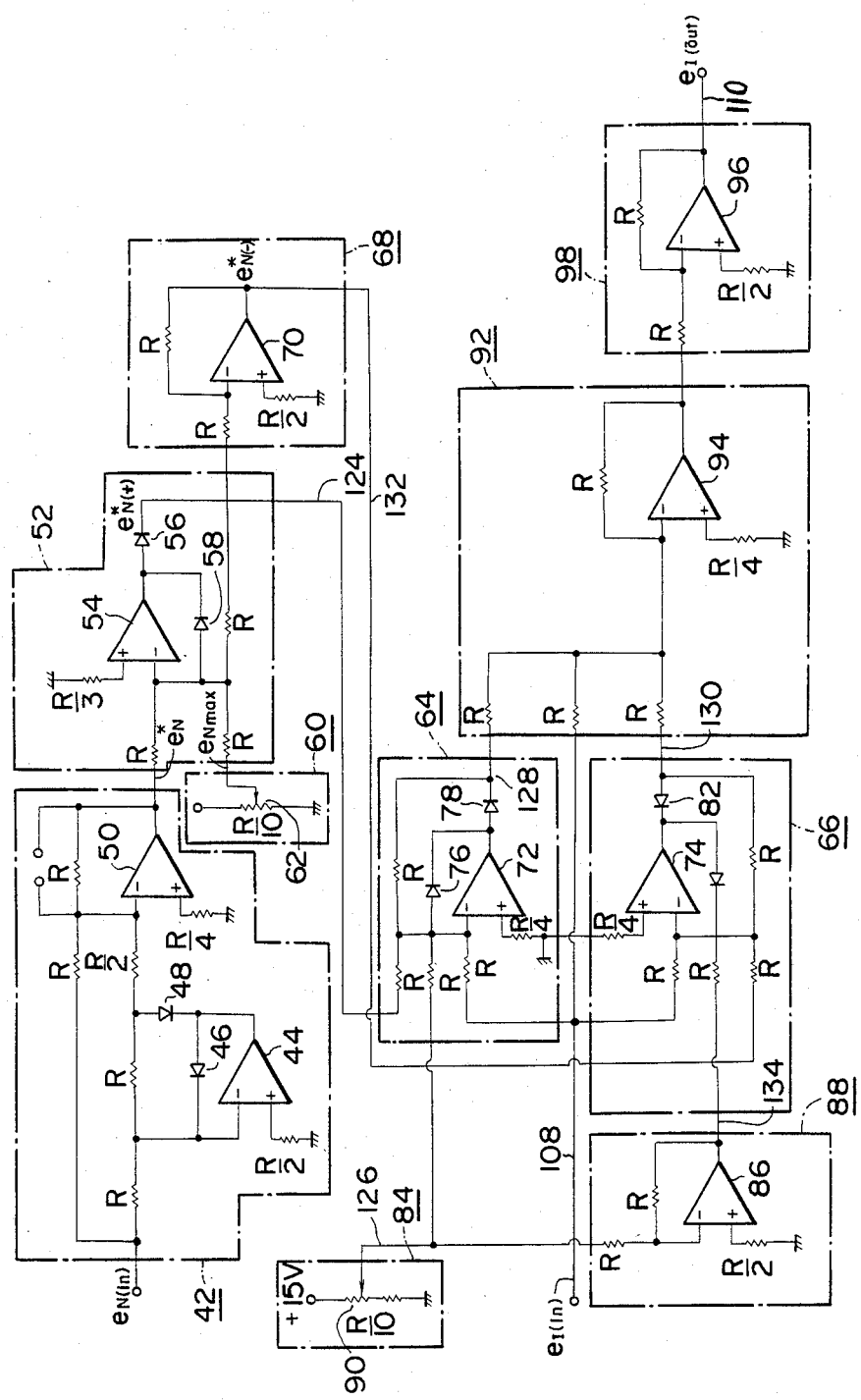
FIG. 4 is a detailed circuit diagram of FIG. 3.

FIG. 3 shows a block diagram showing the current command restricting circuit 30 of the further embodiment, and FIG. 4 shows the detailed circuit arrangement thereof.

In the present embodiment, the speed detection signal 102 is utilized in the current command restricting circuit 30, and a voltage $e_N$ thereof is supplied to an absolute value circuit 42. This absolute value circuit 42 constituted by a full-wave rectifying circuit comprising an inverted amplifying type half-wave rectifying circuit including an operational amplifier 44 and diodes 46, 48 and an inverting amplifier including an operational amplifier 50. An absolute value voltage $*e_N$ of the aforesaid $e_N$ can be obtained at the output end of the operational amplifier 50. According to the above-described arrangement of circuit 42, a error smaller included in $*e_N$ can be effected rather than for example if circuit 42 was constructed by a diode.

The voltage $*e_N$ is supplied to the inverting amplifying type high-wave rectifying circuit 52. The inverting amplifying type half-wave rectifying circuit 52 comprises an operational amplifier 54 and diodes 56, 58, and the voltage $*e_N$ is supplied to the inverting input end of the operational amplifier 54. A maximum speed setting voltage $e_{Nmax}$ is supplied to this inverting amplifying type half-wave rectifying circuit 52 from a maximum speed setting circuit 60. More specifically, the maximum speed setting circuit 60 is constituted by a variable resistor 62 supplied with a negative voltage from an external power source. A maximum speed setting voltage $e_{Nmax}$ in the negative potential thereof is supplied to an inverting input end of the operational amplifier 54. Obtained at an output end of the above-described inverting amplifying type half-wave rectifying circuit 52 is a positive current tolerance value 124 representing a linear function of the speed of the DC motor 18.

The positive linear function current tolerance value $[*e_N(+)]124$ obtained by the inverting amplifying type half-wave rectifying circuit 52 is directly supplied to an inverting positive clamping circuit 64 and is also supplied to an inverting negative clamping circuit 66 through an inverting amplifier 68. The inverting amplifier 68 includes an operational amplifier 70 and obtains a negative linear function current tolerance value $[*e_N(-)]132$. Furthermore, the clamping circuits 64 and 66 are constituted by operational amplifiers 72, 74 and diodes 76, 78, 80 and 82. The positive linear function current tolerance value $[*e_N(+)]124$ is supplied to an inverting input end of the operational amplifier 72, and the negative linear function current tolerance value $[*e_N(-)]132$ inverted by the operational amplifier 70 is supplied to an inverting input end of the operational amplifier 74. In addition, the diodes 76 and 78 and the diodes 80 and 82 are connected to one another to convert an output from the operation amplifier 72 into a positive voltage and convert an output from the operational amplifier 74 into a negative voltage.

This current command restricting circuit 30 is provided with a maximum current setting circuit 84 to output a preset current tolerance value 126 irrespective of the speed of the DC motor 18, the preset current tolerance value 126 is directly supplied to the clamping circuit 64, and also supplied to the clamping circuit 66 through an inverting amplifier 88 including an operational amplifier 86. In this embodiment, the maximum current setting circuit 84 is constituted by a variable resistor 90, to which a positive voltage is supplied from an external power source, the positive preset tolerance value 126 is supplied to an inverting input end of the operational amplifier 72 as being a clamping voltage, and, on the other hand, inverted by the operational amplifier 86 to be converted into a negative preset current tolerance value 134 and supplied to an inverting input end of the operational amplifier 74. Furthermore, supplied to inverting input ends of the operational amplifiers 72 and 74, respectively, is a current command signal 108 indicated by a voltage $e_1$. An inverting positive clamping circuit 64 is inputted with the aforesaid current tolerance values 124, 126 and the current command signal 108, obtains an output 128, and an inverting negative clamping circuit 66 is inputted with the aforesaid current tolerance values 132, 134 and the current command signal 108, and obtains an output 130.

The output 128 from the inverting positive clamping circuit and the output 130 from the inverting negative clamping circuit are supplied to an inverting adding circuit 92 to which the current command signal 108 represented as $e_1$ is supplied. This inverting adding circuit 92 includes an inverting amplifying type operational amplifier 94, and the current command signal 108, the output 128 from the inverting positive clamping circuit and the output 130 from the inverting negative clamping circuit are supplied to an inverting input end of the operational amplifier 94 for the addition. With this arrangement, the current command signal 108 is restricted to or less than the current tolerance value 126 until the speed of the DC motor 18 reaches the predetermined speed, and, when the speed of the DC motor 18 exceeds the predetermined speed, restricted to the current tolerance value 124 which linearly functionally decreases with the decrease of the speed of the DC motor 18.

In addition, the aforesaid variable resistor 62 is set such that the current tolerance value 124 does not enter a flashover region of the DC motor 18 for the regulation. Furthermore, an output from the inverting adding circuit 92 is inverted into a restricted current command signal 110 by an inverting amplifier 98 including the operational amplifier 96, whereby the input current command signal 108 as being $e_1(in)$ is brought in phase with the output current command signal 110 as being $e_1(out)$.

The preferred second embodiment is of the above-described arrangement. Description will now be given of operation thereof.

The current command signal 108 obtained by the comparator 28 is restricted to less than the current tolerance 124 or 126 by the current command restricting circuit 30. More specifically, the command signal 108 is restricted to less than the tolerance value 126 when the speed of the DC motor 18 is less than the predetermined one and an unduly high current flows, and, restricted to less than the current tolerance value 124 which is decreased as the linear function of the speed of the DC motor when the speed of the DC motor exceeds the predetermined one and an unduly high current flows.

As described above, the restricted current command signal 110 restricted by the current command restricting circuit 30 is supplied to the current control circuit 32, whereby the proportional control is exercised over the driving current 100.

Figure 5:
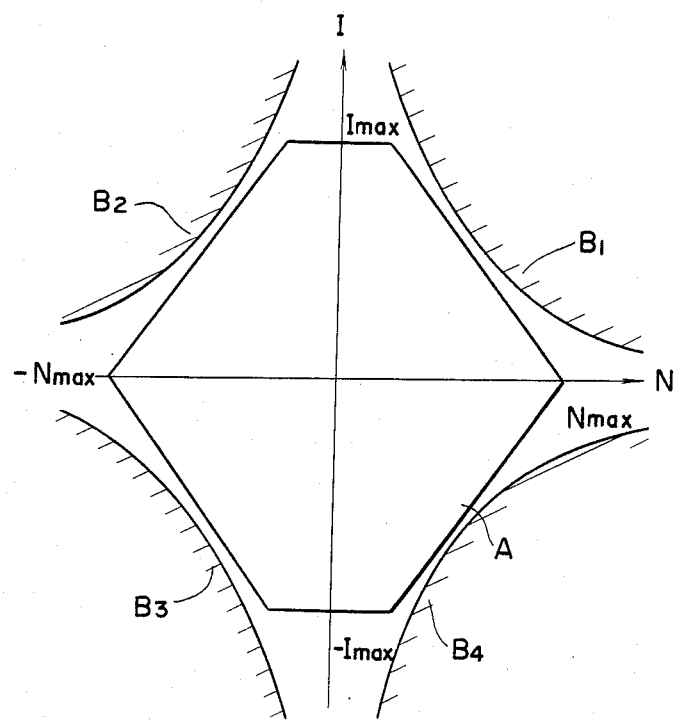
FIG. 5 is an explanatory view illustrating the current restricting characteristics in the present invention.

For this, the direct motor 18 is operated within the region A determined by the current tolerance values 124 and 126 as shown in FIG. 5, without being operated within the flashover regions B1, B2, B3 and B4 of the DC motor 18. Furthermore, the driving current 100 is restricted to or less than the current tolerance value 124, whereby, when the DC motor 18 is of a magnetic type, the magnetism thereof is not demagnetized.

As apparent from the arrangement shown in FIG. 4, the current command restricting circuit 30 can be operated at high speed. At this time the accuracy in the restriction to the current command signal 108 in the current command restricting circuit 30 can be improved in such a manner that an absolute value with high accuracy is obtained in the absolute value circuit 42 by use of the operational amplifier, amplification degrees in all the operational amplifiers are set at 1 so that the operational amplifiers can be free from being affected by a drift and an offset and so forth. Thus, the accuracy in control in the control circuit 20 can be free from being affected by a blind sector, a delay factor, a drift and so on.

As described above, in the present embodiment, the DC motor 18 can avoid the flashover and demagnetization, while maintaining the accuracy in control and the speed in the control circuit 20 of the prior art system.

As has been described hereinabove, the present invention can provide the control circuit of the PWM inverter, capable of exercising control over the DC motor at high speed and with high accuracy.

What is claimed is:

1. A control circuit of a pulse width modulation inverter, connected to a converter for converting AC power to a predetermined direct current for driving a DC motor, said control circuit comprising:
   a main circuit including main transistors arranged in bridge connection and switchingly-driven to supply positive and negative driving currents to said DC motor,
   a speed command circuit for supplying a speed command signal,
   a speed control circuit for comparing said speed command signal from said speed command circuit with a speed detection signal from a speed detector connected to said DC motor for detecting a rotational speed of said DC motor, said speed control circuit supplying a speed command deviation signal,
   a current command restricting circuit, connected to said speed control circuit, for restricting said speed command deviation signal and for supplying a restricted current command signal,
   a counter electromotive force compensating circuit, connected to said speed detector and said current command restricting circuit, for adding said speed detection signal to said restricted current command signal, and for supplying a current command signal,
   a current control circuit comprising a comparator circuit, connected to said counter electromotive force compensating circuit and to a current detector, said current detector connected to said DC motor for detecting a driving current of said DC motor, said current control circuit compares said current command signal with said driving current from said current detector, and supplies a current command deviation signal, a proportional operational circuit, connected to said current control circuit, for exercising a proportional control over said driving current in accordance with said current command deviation signal from said comparator circuit and for supplying a current control signal, and a driver, connected to said current control circuit and said main circuit of said pulse width modulation inverter, and supplying a driving current to said main circuit for PWM switchingly driving said main transistors of said main circuit, thereby compensating for an error in current control from a counter electromotive force of said DC motor.

2. A control circuit of a pulse width modulation inverter as set forth in claim 1, wherein said current command restricting circuit comprises restricting means, connected to said speed control circuit and said speed detector, for restricting said current command signal on the basis of said speed detection signal and for supplying said restricted current command signal.

3. A control circuit of a pulse width modulation inverter as set forth in claim 2, wherein said current command restricting circuit comprises restricting means, connected to said speed detector and said speed command circuit for restricting the driving current to or less than a preset current tolerance value until the speed of the DC motor reaches a predetermined speed and for restricting said current command signal when the speed of the DC motor exceeds the predetermined speed so that the current tolerance value can be rectilinearly decreased with increases in the speed of the DC motor above said predetermined speed, whereby the DC motor avoids a flashover.

4. A control circuit of a pulse width modulation inverter as set forth in claim 1, wherein said counter electromotive force compensating circuit comprises an amplifier, connected to said speed detector, for amplifying said speed detection signal of the DC motor by a predetermined gain; and an adder, connected to said amplifier and said current command restricting circuit, for adding the thus amplified speed detection signal to a restricted current command signal.

5. A control circuit of a pulse width modulation inverter as set forth in claim 3, wherein said counter electromotive compensating circuit comprises an amplifier, connected to said speed detector, for said speed detection signal of the DC motor by a predetermined gain, and an adder, connected to said amplifier and said current command restricting circuit, for adding the thus amplified speed detection signal to a restricted current command signal.

6. A control circuit of a pulse width modulation inverter as set forth in claim 3, wherein said current command restricting circuit comprises:

an absolute value circuit, connected to said speed detector, for extracting an absolute value of said speed detection signal;

a maximum speed setting circuit for outputting a maximum speed setting voltage;

an inverting amplifying type half-wave rectifying circuit, connected to said absolute value circuit and maximum speed setting circuit, for extracting a positive current tolerance value representing a linear function of the speed of the DC motor from the absolute value of the speed detection signal and the maximum speed setting voltage;

a maximum current setting circuit for outputting a preset current tolerance value;

a first inverting amplifier, connected to said half-wave rectifying circuit, for inverting said current tolerance value;

an inverting positive clamping circuit, connected to said maximum current setting circuit and said half-wave rectifying circuit, for clamping said positive current tolerance value to or less than the current tolerance value of said maximum current setting circuit;

a second inverting amplifier, connected to said maximum current setting circuit, for inverting said positive current tolerance value;

an inverting negative clamping circuit, connected to said first and second inverting amplifier, for clamping a negative current tolerance value outputted from said first inverting amplifier to or more than the negative current tolerance value outputted from said second inverting amplifier; and an adder circuit, connected to said inverting positive and negative clamping circuits, for combining the positive current tolerance value outputted from said inverting positive clamping circuit with the negative current tolerance value outputted from said inverting negative clamping circuit to provide a restricted current command signal.

7. A control circuit of a pulse width modulation inverter as set forth in claim 6, wherein said counter electromotive force compensating circuit comprises an amplifier, connected to said speed detector, for amplifying said speed detection signal of the DC motor by a predetermined gain; and an adder, connected to said amplifier and said current command restricting circuit, for adding the thus amplified speed detection signal to a restricted current command signal.

* * * * *